(12) United States Patent
Yamagishi et al.

(10) Patent No.: US 8,027,150 B2
(45) Date of Patent: Sep. 27, 2011

(54) CONDUCTIVE POLYMER SOLID ELECTROLYTIC CAPACITOR

(75) Inventors: Hideo Yamagishi, Kyontanabe (JP);
Kazuyuki Tateishi, Kakogawa (JP);
Hiroyuki Furutani, Takatsuki (JP);
Mutsuaki Murakami, Settsu (JP)

(73) Assignee: Kaneka Corporation, Osaka (JP)

( * ) Notice: Subject to any disclaimer, the term of this patent is extended or adjusted under 35 U.S.C. 154(b) by 296 days.

(21) Appl. No.: 12/068,555

(22) Filed: Feb. 7, 2008

(65) Prior Publication Data
US 2008/0218942 A1 Sep. 11, 2008

(30) Foreign Application Priority Data
Feb. 9, 2007 (JP) .................................. 2007-031049
Jan. 18, 2008 (JP) .................................. 2008-009221

(51) Int. Cl.
*H01G 9/00* (2006.01)

(52) U.S. Cl. ........ 361/523; 361/516; 361/519; 361/525; 361/528; 361/529

(58) Field of Classification Search .................. 361/523, 361/525–529, 502–504, 516–519, 540–541, 361/530–531
See application file for complete search history.

(56) References Cited

U.S. PATENT DOCUMENTS

| | | | | |
|---|---|---|---|---|
| 6,547,990 B2 * | 4/2003 | Shinozaki et al. | ............. | 252/502 |
| 6,882,522 B2 * | 4/2005 | Naito et al. | .................... | 361/523 |
| 6,987,663 B2 * | 1/2006 | Merker et al. | ................ | 361/523 |
| 7,099,146 B2 * | 8/2006 | Kobayashi et al. | ............ | 361/523 |
| 7,297,289 B2 * | 11/2007 | Sato et al. | ..................... | 252/62.2 |
| 7,736,398 B2 * | 6/2010 | Tateishi et al. | ............... | 29/25.03 |
| 7,746,623 B2 * | 6/2010 | Murakami et al. | ............ | 361/523 |

FOREIGN PATENT DOCUMENTS
JP 2006-024708 A 1/2006
WO WO-2005/012599 A1 2/2005

\* cited by examiner

*Primary Examiner* — Nguyen T Ha
(74) *Attorney, Agent, or Firm* — Birch, Stewart, Kolasch & Birch, LLP

(57) ABSTRACT

A solid electrolytic capacitor having an electrolytic layer containing at least two types of ionic liquids and a conductive polymer is provided. Preferably, the ionic liquids include at least one type of ionic liquid for supplying an excellent impedance characteristic and at least one type of ionic liquid for supplying an excellent withstand voltage characteristic. Thus, a solid electrolytic capacitor exhibiting a high withstand voltage and an excellent impedance characteristic can be obtained.

18 Claims, 1 Drawing Sheet

CONDUCTIVE POLYMER SOLID ELECTROLYTIC CAPACITOR

This nonprovisional application is based on Japanese Patent Applications Nos. 2007-031049 and 2008-009221 filed with the Japan Patent Office on Feb. 9, 2007 and Jan. 18, 2008, respectively, the entire contents of which are hereby incorporated by reference.

BACKGROUND OF THE INVENTION

1. Field of the Invention

The present invention relates to a conductive polymer solid electrolytic capacitor excellent in withstand voltage characteristic and impedance characteristic.

2. Description of the Background Art

A conductive polymer solid electrolytic capacitor employing a conductive polymer as an electrolyte exhibits an excellent impedance characteristic, and increasingly expands markets. An electrolytic capacitor is generally constituted of an anode metal prepared from a valve metal such as aluminum, tantalum or niobium, a dielectric film formed by an oxide film provided on the surface of the anode metal and a cathode formed through an electrolytic layer provided on the dielectric film. The electrolyte of the electrolytic capacitor has two important functions, i.e., a function of protecting and repairing the extremely thin oxide film and another function of drawing the capacitance from the dielectric film provided on the anode as a de facto cathode. A conductive polymer solid electrolytic capacitor typically employs a conductive polymer such as solid polypyrrole or a polythiophene derivative as an electrolyte. Such a conductive polymer has by far higher electric conductivity (i.e., electronic conductivity) as compared with a liquid electrolyte employed for a general electrolytic capacitor. Therefore, the capacitor employing this conductive polymer as the electrolyte can reduce the internal impedance, and exhibits excellent characteristics particularly as a high-frequency circuit capacitor.

However, the conductive polymer essentially has no ionic conductivity. Therefore, the capacitor employing the conductive polymer as the electrolyte is inferior to a conventional capacitor employing an electrolytic solution in repairability (i.e., anodic oxidation) for the oxide film of the electrolytic capacitor. Consequently, a conductive polymer solid electrolytic capacitor exhibiting a high withstand voltage cannot be manufactured. More specifically, a conductive polymer solid electrolytic capacitor employing aluminum for an anode withstands a voltage of about 16 V in practical use when subjected to 40 V chemical conversion, for example, and a conductive polymer solid electrolytic capacitor employing tantalum withstands a voltage of about 12 V in practical use when subjected to 24 V chemical conversion, for example. In the 40 V chemical conversion, a DC voltage of 40 V is applied when an oxide film of a dielectric substance is formed on the surface of the valve metal, and a capacitor exhibiting a withstand voltage of 40 V must be ideally obtained in this case. While the withstand voltage in practical use can be increased in principle by increasing the chemical conversion voltage, the capacitance is reduced as the chemical conversion voltage is increased in this case. Further, the withstand voltage in practical use is not increased in proportion to the chemical conversion voltage.

Typical electrolytic capacitors include an aluminum electrolytic capacitor employing aluminum as an anode metal and a tantalum electrolytic capacitor employing tantalum as an anode metal. In general, a porous electrode obtained by sintering tantalum powder is employed for the tantalum electrolytic capacitor. On the other hand, aluminum electrolytic capacitors include a chip-type electrolytic capacitor and a wound-type electrolytic capacitor. In order to manufacture the chip-type electrolytic capacitor employing a conductive polymer as an electrolyte, the electrolyte consisting of the conductive polymer is formed on an anode foil made of aluminum by electrolytic polymerization or chemical polymerization, carbon paste and silver paste are thereafter applied, and these components are stacked and dried for preparing a capacitor element. The chip-type electrolytic capacitor manufactured in the aforementioned manner has a remarkably excellent frequency characteristic, while it is extremely difficult to manufacture the element, disadvantageously leading to a high rejection rate. On the other hand, the wound-type electrolytic capacitor employing a conductive polymer as an electrolyte comprises an anode foil of aluminum provided with a dielectric oxide film on the surface thereof, a cathode foil and a separator provided between the cathode foil and the anode foil. After these components are wound, the electrolyte is formed by impregnating and polymerizing a monomer forming the conductive polymer.

While the separator is indispensable in order to prevent the wound-type electrolytic capacitor from a short circuit, the impedance characteristic of the capacitor is deteriorated due to the separator. In other words, the wound-type electrolytic capacitor, advantageous for increasing the capacitance, is inferior to the chip-type electrolytic capacitor in high-frequency characteristic.

As hereinabove described, the conductive polymer solid electrolytic capacitor generally has one of the two typical structures. However, it is difficult to obtain a high withstand voltage while maintaining a high-frequency characteristic without reducing the capacitance by increasing the thickness of a dielectric layer in either structure. In order to solve this problem, the inventors have already developed an electrolyte consisting of an ionic liquid and a conductive polymer (refer to pamphlet of International Patent Laying-Open No. 2005/012599). The inventors have found that an ionic liquid has an excellent function of anodizing a valve metal and can repair defects of an oxide film of aluminum, for example, for implementing an electrolytic capacitor exhibiting a high withstand voltage. However, a general ionic liquid, exhibiting excellent ionic conductivity, has no electronic conductivity. If a large quantity of ionic liquid is added in order to implement a capacitor exhibiting a high withstand voltage, therefore, the impedance characteristic of the capacitor is disadvantageously deteriorated. If the quantity of the ionic liquid is small, on the other hand, the withstand voltage is not improved although an excellent impedance characteristic is obtained in this case. In other words, it is extremely important for a solid electrolytic capacitor comprising an electrolyte consisting of an ionic liquid and a conductive polymer to attain both of an excellent withstand voltage characteristic and an excellent impedance characteristic, which are in trade-off relation.

On the other hand, a method of forming an electrolyte by previously impregnating an electrode foil with an ionic liquid and thereafter polymerizing a monomer for forming a conductive polymer is also disclosed (Japanese Patent Laying-Open No. 2006-24708). However, this document, describing that the capacitance and a capacitive impregnation ratio can be improved, gives no description as to implementability of an excellent withstand voltage characteristic.

SUMMARY OF THE INVENTION

The present invention has been proposed in order to solve the aforementioned problems, and an object thereof is to provide an electrolytic capacitor exhibiting a high withstand voltage and an excellent impedance characteristic.

The inventors have conducted a deep study as to a solid electrolytic capacitor having an electrolytic layer containing a conductive polymer and an ionic liquid, to find that the effect of improving the withstand voltage varies with the type of the ionic liquid, that the impedance characteristic can be improved by employing a small quantity of specific ionic liquid, and that the effect of improving the impedance characteristic also varies with the type of the ionic liquid.

Consequently, the inventors have found that it is difficult to obtain a solid electrolytic capacitor exhibiting a high withstand voltage and an excellent impedance characteristic by merely optimizing the quantity of and a method of adding the ionic liquid when only one type of ionic liquid is employed and that the aforementioned problems can be solved by combining at least two types of ionic liquids having different effects on the respective characteristic parameters with each other.

The present invention relates to a solid electrolytic capacitor having an electrolytic layer containing at least two types of ionic liquids and a conductive polymer. In particular, the present invention relates to a solid electrolytic capacitor at least comprising an electrolytic layer as well as an anode and a cathode opposed to each other through the electrolytic layer, while the anode is formed by an anode metal and a dielectric film, and the electrolytic layer is formed in contact with the dielectric film and contains at least two types of ionic liquids and a conductive polymer.

In the solid electrolytic capacitor according to the present invention, the aforementioned at least two types of ionic liquids preferably contain at least two types of cationic components and/or at least two types of anionic components.

In the solid electrolytic capacitor according to the present invention, a high ionic conductivity region is preferably so formed as to cover the overall surface of the dielectric film.

In the solid electrolytic capacitor according to the present invention, the aforementioned conductive polymer is preferably at least partially contained as a composite containing the ionic liquids and the conductive polymer, and the aforementioned high ionic conductivity region preferably consists of an ionic liquid and/or the composite.

In the solid electrolytic capacitor according to the present invention, the aforementioned conductive polymer is more preferably entirely contained as the composite containing the ionic liquids and the conductive polymer. Thus, the ionic liquids can be rendered present on the overall region of the electrolytic layer.

In the solid electrolytic capacitor according to the present invention, at least one ionic liquid preferably contains any cationic component selected from a group consisting of imidazolium cation, pyridinium cation, pyrrolidium cation, ammonium cation and triazine derivative cation.

In the solid electrolytic capacitor according to the present invention, at least one ionic liquid preferably contains any anionic component selected from a group consisting of $R_4OSO_3^-$, $R_4SO_3^-$, $R_4OOSO_3^-$, $R_4COOSO_3^-$, $R_4O$-$COOSO_3^-$, $R_4COO^-$, $BF_4^-$, $PF_6^-$ and $N(SO_2CF_3)_2^-$. In these formulas, $R_4$ represents an aliphatic hydrocarbon radical or an aromatic hydrocarbon radical allowed to have one or more substituents.

According to the present invention, ionic liquids for supplying an excellent impedance characteristic and an excellent withstand voltage characteristic to the solid electrolytic capacitor respectively are employed in combination with each other. These ionic liquids are so combined with each other as to implement a solid electrolytic capacitor exhibiting a high withstand voltage and a low impedance. While an ionic liquid containing an anionic component of $R_4OSO_3^-$ or $R_4SO_3^-$ can be listed as that added in order to reduce the impedance, both of ionic liquids containing anionic components of $R_4OSO_3^-$ and $R_4SO_3^-$ respectively may be employed. However, $R_4OSO_3^-$ may be decomposed into the corresponding alcohol and sulfate anion by hydrolysis. In consideration of safety, therefore, the ionic liquid containing the anionic component of $R_4SO_3^-$ is preferably employed.

On the other hand, an ionic liquid containing an anionic component of $R_4COO^-$, $BF_4^-$, $PF_6^-$ or $N(SO_2CF_3)_2^-$ can be listed as that for obtaining an electrolytic layer excellent in repairability for the dielectric film, i.e., excellent in withstand voltage characteristic, and ionic liquids containing any combination of the anionic components of $R_4COO^-$, $BF_4^-$, $PF_6^-$ and $N(SO_2CF_3)_2^-$ may be employed. Preferably, the ionic liquid contains $PF_6^-$ or $N(SO_2CF_3)_2^-$. The ionic liquid containing the anionic component selected from the above is so employed that a solid electrolytic capacitor particularly excellent in withstand voltage characteristic can be obtained.

In order to compatibly attain both of the high withstand voltage and the low impedance, a combination of at least one ionic liquid supplying an excellent impedance characteristic and at least one ionic liquid supplying an excellent withstand voltage characteristic is preferably employed. The types and the blending ratios of the employed ionic liquids are not particularly restricted, but preferably so selected as to attain desired capacitor characteristics.

In the solid electrolytic capacitor according to the present invention, the conductive polymer preferably consists of at least one material selected from a group consisting of polythiophene or a derivative thereof, polypyrrole or a derivative thereof, polyaniline or a derivative thereof and polyquinone or a derivative thereof.

The conductive polymer more preferably consists of poly (2,3-dihydrothieno-[3,4-b]-1,4-dioxin) (also referred to as poly-3,4-ethylene dioxythiophene) or polypyrrole.

The present invention also relates to a method of manufacturing a solid electrolytic capacitor for obtaining the aforementioned solid electrolytic capacitor, including an anode forming step of forming an anode consisting of an anode metal and a dielectric film, an electrolytic layer forming step of forming an electrolytic layer in contact with the dielectric film and a cathode forming step of forming a cathode on the surface of the electrolytic layer, while the electrolytic layer forming step includes a chemical polymerization step of forming a composite containing ionic liquids and a conductive polymer by dipping the anode in a chemical polymerization composition containing at least two types of ionic liquids and a polymerizable substance and thereafter polymerizing the polymerizable substance by chemical polymerization. The chemical polymerization step is carried out only once, or repeated a plurality of times. In the present invention, the molar ratios (ionic liquids/polymerizable substance) between at least two types of ionic liquids serving as raw materials supplying anionic components contained in the electrolyte and the polymerizable substance in the chemical polymerization composition are preferably set to at least 0.01/1 and not more than 10/1 as to the ionic liquids respectively, and more preferably set to at least 0.01/1 and not more than 0.6/1. The effects of improving the impedance characteristic and the withstand voltage characteristic are small if the molar ratios are less than 0.01/1, while sufficient strength for holding the shape of the electrolyte may not be attainable if the molar ratios exceed 10/1. If the molar ratios exceed 0.6/1, the impedance may be increased to the contrary.

In the method of manufacturing a solid electrolytic capacitor according to the present invention, the conductive polymer obtained in the chemical polymerization step is preferably poly(2-3,dihydrothieno-[3,4-b]-1,4-dioxin) or polypyrrole. The step is stable and an electrolyte of excellent quality is easily obtained in the former case, while an electrolyte of excellent quality can be obtained at a low cost when the step is stabilized in the latter case.

The solid electrolytic capacitor according to the present invention can be manufactured by interposing the ionic liquids along with the polymerizable substance in chemical polymerization of the polymerizable substance, or can be manufactured by dipping a conductive polymer layer obtained by chemical polymerization in the ionic liquids.

While at least one ionic liquid employed in the method according to the present invention preferably contains any cationic component selected from a group consisting of imidazolium cation, pyridinium cation, pyrrolidium cation, ammonium cation and triazine derivative cation, the present invention is not restricted to this. The effects of the present invention are mainly dominated by the anionic components of the ionic liquids, and not much influenced by the type of the cation. However, it is unpreferable to select such cation that the ionic liquid present as a salt is solidified under a specific environment.

In the method of manufacturing a solid electrolytic capacitor according to the present invention, the aforementioned at least two types of ionic liquids preferably contain at least two types of anionic components selected from a group consisting of $R_4OSO_3^-$, $R_4SO_3^-$, $R_4OOSO_3^-$, $R_4COOSO_3^-$, $R_4O\text{-}COOSO_3^-$, $R_4COO^-$, $BF_4^-$, $PF_6^-$ and $N(SO_2CF_3)_2^-$. In these formulas, $R_4$ represents an aliphatic hydrocarbon radical or an aromatic hydrocarbon radical allowed to have one or more substituents.

According to the present invention, an electrolytic capacitor highly compatibly attaining both of a withstand voltage characteristic and an impedance characteristic can be obtained by interposing at least two types of anions in the conductive polymer constituting the electrolytic layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
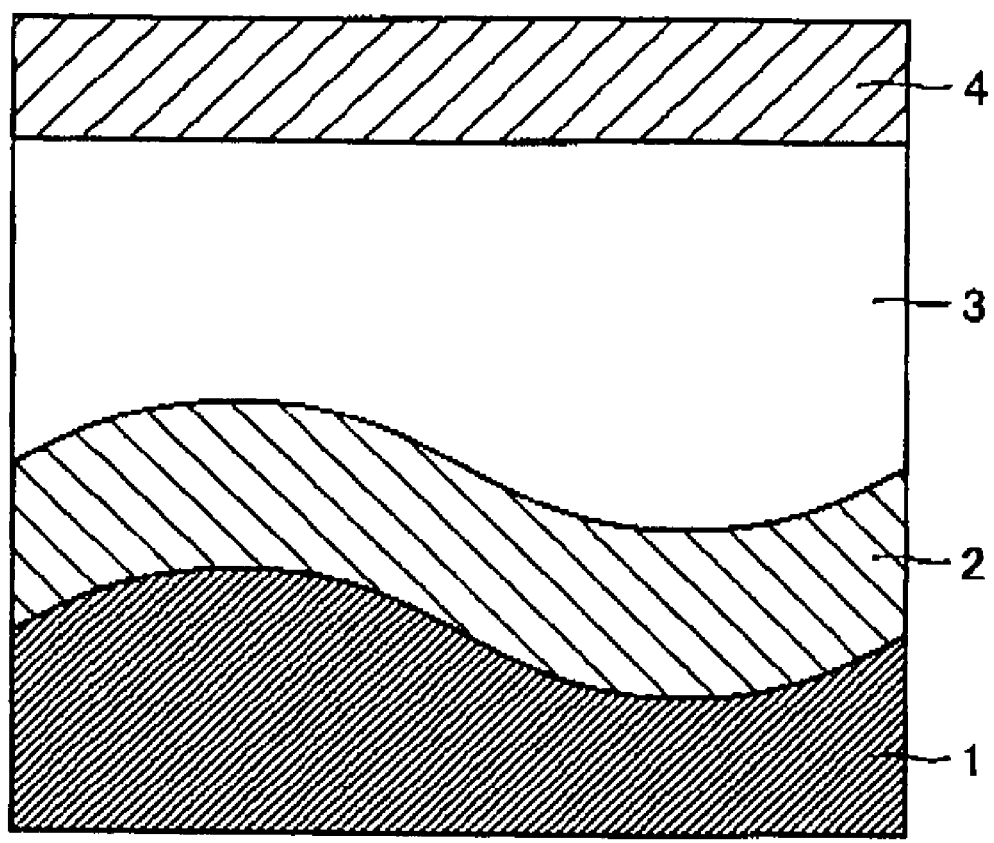
FIG. 1 is a sectional view schematically showing a capacitor element of a solid electrolytic capacitor according to Example 1.

An electrolytic capacitor according to the present invention at least comprises an electrolytic layer as well as an anode and a cathode opposed to each other through the electrolytic layer, while the anode is formed by an anode metal and a dielectric film. The electrolytic layer contains at least ionic liquids and a conductive polymer, and is formed in contact with the dielectric film. According to the present invention, the electrolytic layer contains at least two types of ionic liquids, preferably at least two types of anionic components of the ionic liquids.

At least one of the ionic liquids contained in the electrolytic layer is introduced in order to reduce the impedance of the electrolytic capacitor. At least one of the remaining ionic liquid(s) is introduced in order to improve the withstand voltage of the electrolytic capacitor, and excellently functions to repair and protect the dielectric film in the electrolytic capacitor according to the present invention.

According to the results of the study conducted by the inventors, an effect of improving conductivity is attained when a specific ionic liquid is interposed in chemical polymerization of a conductive polymer, as hereinabove described. While the cause therefor is not yet identified in detail, it is estimated that the specific ionic liquid influences the degree of polymerization, the morphology and doping of the conductive polymer in relation to the mechanism of polymerization. However, the ionic liquid essentially has no electronic conductivity. When the content of the ionic liquid occupied in the overall electrolytic layer is increased, therefore, it is difficult for the electrolytic capacitor to attain an excellent impedance characteristic due to reduction in electronic conductivity of the overall electrolytic layer. Therefore, the ionic liquid must be added in a proper quantity to a conductive polyelectrolyte exhibiting an excellent impedance characteristic. This quantity depends on the type of the ionic liquid, particularly on the type of the anionic component thereof. If the ionic liquid introduced in order to reduce the impedance of the electrolytic capacitor is limited to only one type, therefore, an ionic liquid exhibiting the effect of reducing the impedance with the minimum quantity is preferably selected.

Noting the withstand voltage of the electrolytic capacitor, on the other hand, an effect of repairing and protecting the dielectric film of the electrolytic capacitor can be attained and the withstand voltage of the electrolytic capacitor is improved due to an ionic liquid introduced into the electrolytic layer, as hereinabove described. This effect of improving the withstand voltage also depends on the type of the ionic liquid, particularly on the type of the anionic component thereof. While the withstand voltage tends to be improved as the quantity of the introduced ionic liquid is increased, the ionic liquid cannot be introduced in an excess quantity due to a problem in strength such as self supportability. In consideration of the characteristics of the element, it is unpreferable to introduce the ionic liquid to an extent reducing the impedance, as described above. If the ionic liquid introduced in order to improve the withstand voltage of the electrolytic capacitor is limited to only one type, therefore, an ionic liquid exhibiting the effect of improving the withstand voltage with the minimum quantity is preferably selected and introduced in a quantity exerting no bad influence on the impedance.

According to the results of the study conducted by the inventors, the effect of improving the withstand voltage of the electrolytic capacitor remarkably tends to depend on the anionic component of the ionic liquid. This is conceivably because the anionic component remarkably influences defect repairability for the dielectric layer and anodic oxidation. However, the effect may vary irrelevantly to the anionic component. More specifically, the effect of improving the withstand voltage is reduced when not an ionic liquid but solid salt is introduced, even if the anionic component of the latter is identical to that of the former. When the solid salt is employed, a larger quantity of anionic component is required in order to attain an effect equivalent to that of the ionic liquid.

For example, while iron salt is frequently employed as a polymerization promoter contributing to polymerization of a conductive polymer, an effect of improving the withstand voltage attained by adding the polymerization promoter is by far smaller as compared with that of the ionic liquid, even if the anionic components thereof are identical to each other. This is estimated as because the anionic component is present as solid salt in the electrolyte. This means that the ionic liquid is preferably present in a liquid state at the operating temperature of the electrolytic capacitor. When phase transition from a liquid to a solid and from the solid to the liquid is repeated, the leakage current of the electrolytic capacitor may be gradually increased. Therefore, an ionic liquid causing phase transition in use or in the process of transportation or custody is not preferable. At least two types of ionic liquids serving as the raw materials supplying the anionic components contained in the electrolytic layer are preferably liquid salt at a temperature of at least 25° C., more preferably at least 0° C., further preferably at least −40° C., in order to obtain the conductive polymer solid electrolytic capacitor according to the present invention.

According to the present invention, ionic liquids containing at least two types of anions are introduced into the conductive polymer layer, in order to compatibly attain both of an excellent withstand voltage characteristic and an excellent impedance characteristic in the conductive polymer solid electrolytic capacitor. The ionic liquids can be introduced by a method of dipping the dielectric film in the ionic liquids before forming the conductive polymer, a method of mixing the ionic liquids into a monomer of the conductive polymer or a polymerization promoter such as an oxidant, a method of dipping the conductive polymer layer in the ionic liquids after polymerization, a combination of these methods or repetition of any of these methods, and the solid electrolytic capacitor according to the present invention can be obtained by any of these methods. Further, electrolytic layers containing the ionic liquids in different concentrations can be stacked. If polymerization is performed a plurality of times with chemical polymerization compositions containing the ionic liquids in different concentrations in the method of mixing the ionic liquids into a monomer of the conductive polymer or a polymerization promoter such as an oxidant, for example, an electrolytic layer having a desired concentration distribution of the ionic liquids can be formed.

In the electrolytic layer of the solid electrolytic capacitor according to the present invention, the conductive polymer may be entirely formed as a composite containing the ionic liquids and the conductive polymer, or may be only partially formed as the composite so that the remaining part is present as a single conductive polymer.

The ionic liquids employed in the present invention are in liquid states around the room temperature although the same are constituted of only ions, and formed by combinations of cationic components such as imidazolium and proper anionic components. In the present invention, hydrophilic or lipophilic ionic liquids are preferably employed in order to coexist with the polymerization promoter, a solvent such as water or an organic solvent and the like in formation of the electrolytic layer, and water-soluble or oil-soluble ionic liquids are particularly preferable.

For example, imidazolium cation, pyridinium cation, pyrrolidium cation, ammonium cation or triazine derivative cation can be listed as the cationic components constituting the ionic liquids suitably employed in the present invention. In particular, imidazolium cation is preferably employed in consideration of excellent handleability. The electrolytic layer of the solid electrolytic capacitor according to the present invention may contain at least two types of cationic components.

While $R_A OSO_3^-$, $R_A SO_3^-$, $R_A OOSO_3^-$, $R_A COOSO_3^-$, $R_A OCOOSO_3^-$, $R_A COO^-$, $BF_4^-$, $PF_6^-$ and $N(SO_2CF_3)_2^-$ can be listed as the anionic components constituting the ionic liquids, the present invention is not restricted to these. The electrolytic layer of the solid electrolytic capacitor according to the present invention preferably contains at least two types of anionic components.

According to the present invention, the ionic liquids for supplying an excellent impedance characteristic and an excellent withstand voltage characteristic to the solid electrolytic capacitor respectively are employed in combination with each other. A solid electrolytic capacitor exhibiting a high withstand voltage and a low impedance is implemented by using these ionic liquids in combination with each other. An ionic liquid containing an anionic component of $R_A OSO_3^-$ or $R_A SO_3^-$ can be listed as that added in order to reduce the impedance, and both of ionic liquids containing anionic components of $R_A OSO_3^-$ and $R_A SO_3^-$ respectively may be employed. However, $R_A OSO_3^-$ may be decomposed into the corresponding alcohol and sulfate anion by hydrolysis. In consideration of safety, therefore, the ionic liquid containing the anionic component of $R_A SO_3^-$ is preferably employed. $R_A$ represents an aliphatic hydrocarbon radical or an aromatic hydrocarbon radical allowed to have one or more substituents as described above. While a hydrocarbon radical such as a methyl radical, an ethyl radical, an n-propyl radical, an iso-propyl radical, an n-butyl radical, a sec-butyl radical or a tert-butyl radical or a fluoroalkyl radical such as a trifluoromethyl radical or a pentafluoroethyl radical can be listed as the aliphatic hydrocarbon radical allowed to have one or more substituents, the fluoroalkyl radical is preferable in order to supply a particularly excellent impedance characteristic, and the trifluoromethyl radical is particularly preferable. A phenyl radical, a p-tolyl radical, a xylyl radical, a p-methoxyphenyl radical or a p-chlorophenyl radical can be listed as the aromatic hydrocarbon radical allowed to have one or more substituents, and the p-tolyl radical having a particularly high effect of reducing the impedance is preferable.

On the other hand, an ionic liquid containing an anionic component of $R_A COO^-$, $BF_4^-$, $PF_6^-$ or $N(SO_2CF_3)_2^-$ can be listed as that for obtaining an electrolytic layer excellent in repairability for the dielectric film, i.e., excellent in withstand voltage characteristic, and these ionic liquids may be used together. Preferably, the ionic liquid containing the anionic component of $PF_6^-$ or $N(SO_2CF_3)_2^-$ is employed. A solid electrolytic capacitor particularly excellent in withstand voltage characteristic can be obtained by employing an ionic liquid containing an anionic component selected from the above.

More specifically, methyl ethyl imidazolium-p-toluenesulfonic acid, butyl methyl imidazolium-p-toluenesulfonic acid, methyl ethyl imidazolium-trifluoromethanesulfonic acid or butyl methyl imidazolium-trifluoromethanesulfonic acid is preferably employed in the present invention as the ionic liquid for reducing the impedance, and ethyl methyl imidazolium-$BF_4$, butyl methyl imidazolium-$BF_4$, butyl ethyl imidazolium-$F_3CSO_2NSO_2CF_3^-$ or ethyl methyl imidazolium-$F_3CSO_2NSO_2CF_3^-$ is preferably employed for supplying a high withstand voltage characteristic. Needless to say, the ionic liquids preferable for the present invention are not restricted to these.

In order to compatibly attain both of a high withstand voltage and a low impedance, a combination of at least one ionic liquid supplying an excellent impedance characteristic and at least one ionic liquid supplying an excellent withstand voltage characteristic is preferably employed. The types and the blending ratios of the employed ionic liquids are not particularly restricted, but preferably so selected as to attain desired capacitor characteristics.

For example, at least one material selected from a group consisting of polythiophene or a derivative thereof, polypyrrole or a derivative thereof, polyaniline or a derivative thereof and polyquinone or a derivative thereof, having high conductivity and excellent stability such as heat resisting property, is particularly preferably employed as the conductive polymer contained in the electrolytic layer according to the present invention. For example, polyethylene dioxythiophene (PEDOT) or poly-alkylthiophene synthesized from a 3-methylthiophene monomer can be listed as the derivative of polythiophene. While PEDOT is particularly preferable for the object of the present invention in consideration of electronic conductivity, the present invention is not restricted to this. While a material having a pyrrole skeleton with a substituent such as a hydroxyl radical, a carboxyl radical or an alkyl radical can be listed as the derivative of polypyrrole, the present invention is not restricted to this. While a material having an alkyl radical, a cyano radical, a sulfone radical or a carboxyl radical on a polyaniline skeleton can be listed as the derivative of polyaniline, the present invention is not restricted to this. While a polybenzoquinone derivative synthesized from a benzoquinone monomer having a substituent, a polynaphthoquinone derivative synthesized from a naphthoquinone monomer having a substituent or a polyanthraquinone derivative synthesized from an anthraquinone monomer having a substituent can be listed as the derivative of polyquinone, the present invention is not restricted to this. In particular, a conductive polymer consisting of poly(2,3-dihydrothieno-[3,4-b]-1,4-dioxin) or polypyrrole is preferably employed in consideration of conductivity and heat resistance.

The solid electrolytic capacitor according to the present invention at least comprises an electrolytic layer containing at least two types of ionic liquids and a conductive polymer coexistent with each other, as well as an anode and a cathode opposed to each other through the electrolytic layer. The solid electrolytic capacitor according to the present invention may be either a chip-type capacitor or a wound-type capacitor. A chip-type solid electrolytic capacitor typically comprises a capacitor element prepared by stacking an electrolytic layer and a cathode in this order on a dielectric film of an anode formed by an anode metal provided with the dielectric film on the surface thereof and a connecting terminal electrically connected with the capacitor element. On the other hand, a wound-type solid electrolytic capacitor typically comprises a capacitor element prepared by successively stacking and winding an electrolytic layer, a separator, a cathode and another separator in this order on a dielectric film of an anode formed by an anode metal provided with the dielectric film on the surface thereof radially from inside, and a connecting terminal electrically connected with the capacitor element.

Each separator is constituted of a communicative porous base material such as a communicative porous base material consisting of a synthetic polymer or cellulose fiber, a communicative porous base material consisting of glass fiber, or nonwoven fabric. For example, polyolefin, polyester, nylon, polyamide, polyimide or fluorinated polyolefin can be listed as the aforementioned synthetic polymer. As the aforementioned cellulose fiber, viscose rayon or cuprammonium rayon can be listed as regenerated cellulose fiber, Manila hemp, hongma, sisal hemp or esparto can be listed as nonwood pulp fiber, or softwood pulp fiber or hardwood pulp fiber can be listed as wood pulp fiber. In particular, polyolefin or cellulose fiber is preferably employed. In the separator, a separator material of polyolefin or cellulose fiber, for example, and the conductive polymer of the electrolytic layer are generally composited.

A well-known anode for a solid electrolytic capacitor can be preferably used as the anode of the solid electrolytic capacitor according to the present invention, and an anode formed by an anode metal such as that prepared by etching the surface of an electrode foil of aluminum or the like for forming an etching hole or a powder electrode of tantalum or the like and a dielectric film consisting of an oxide film formed on the surface of the anode metal by a method such as anodic oxidation can be listed, for example. The aforementioned anodic oxidation can be performed by dipping the anode metal in an aqueous solution of ammonium adipate or the like, for example, and applying a chemical conversion voltage.

The cathode can be prepared from carbon paste and silver paste, for example, by a well-known method. The anode and the cathode are connected to terminals respectively. Thus, a solid electrolytic capacitor at least comprising an anode, an electrolytic layer and a cathode can be formed.

A typical method of manufacturing a solid electrolytic capacitor according to the present invention is now described with reference to an embodiment. In the solid electrolytic capacitor according to the present invention, components not particularly mentioned in the following description are not particularly restricted, but well-known components can be properly applied. While the following embodiment is described with reference to a case of forming a chip-type solid electrolytic capacitor with an anode provided with an etching hole, the present invention is not restricted to this.

This embodiment is described with reference to a case of forming an electrolytic layer through a chemical polymerization step. The method of manufacturing a solid electrolytic capacitor according to the present embodiment includes an anode forming step of forming an anode consisting of an anode metal and a dielectric film, an electrolytic layer forming step of forming an electrolytic layer in contact with the dielectric film and a cathode forming step of forming a cathode on the surface of the electrolytic layer. The electrolytic layer forming step includes a chemical polymerization step of forming a composite containing ionic liquids and a conductive polymer by dipping the anode in a chemical polymerization composition containing at least the ionic liquids and a polymerizable substance and thereafter polymerizing the polymerizable substance by chemical polymerization. The chemical polymerization step can be carried out only once, or repeated a plurality of times.

The chemical polymerization step can be repeated a plurality of times while varying the mass ratios between the ionic liquids and the polymerizable substance in the chemical polymerization composition.

In the method according to this embodiment, the composite containing the ionic liquids and the conductive polymer is formed in the chemical polymerization step. This composite contains at least two types of ionic liquids.

(Anode Forming Step)

The anode of the solid electrolytic capacitor is prepared by etching the surface of an anode metal such as an aluminum foil and forming an etching hole and thereafter forming the dielectric film consisting of an oxide film by anodic oxidation, for example. The anodic oxidation can be performed by a well-known method such as a method of dipping the anode metal in an oxidant such as an aqueous solution of sodium adipate and applying a prescribed chemical conversion voltage.

Then, the electrolytic layer is formed on the surface of the dielectric film of the anode formed in the aforementioned manner.

(Electrolytic Layer Forming (Chemical Polymerization) Step)

Then, the anode is dipped in the chemical polymerization composition at least containing the ionic liquids and the polymerizable substance and pulled up, and the polymerizable substance is thereafter polymerized by chemical polymerization, thereby forming the composite containing the ionic liquids and the conductive polymer.

The aforementioned various ionic liquids suitably employed in the present invention can be used as the ionic liquids blended with the chemical polymerization composition. When a solvent is blended with the chemical polymerization composition, ionic liquids compatible with this solvent are preferably employed. In this case, an electrolytic layer having a more homogeneous structure can be formed.

A raw monomer or a raw oligomer supplying the target conductive polymer in the electrolytic layer can be listed as the polymerizable substance. For example, 3,4-ethylene dioxythiophene, a thiophene monomer, a 3-hexylthiophene monomer, a 3-octylthiophene monomer, a 3-butylthiophene monomer or a 3-cyclohexylthiophene monomer can be listed as a monomer supplying polythiophene as the conductive polymer contained in the electrolytic layer. Further, a pyrrole monomer, an aniline monomer or a 1,4-phenylenevinylene monomer can be listed as a raw monomer supplying a conductive polymer preferably formed by chemical polymerization.

For example, a combination of an ionic liquid consisting of imidazolium cation and sulfonate anion, another ionic liquid consisting of imidazolium cation and tetrafluoroborate anion and a 3,4-ethylene dioxythiophene monomer can be listed as a preferable combination of the plurality of ionic liquids and the raw monomer in chemical polymerization. This combination is preferable in a point that the same has higher repairability with respect to the dielectric film than an electrolyte consisting of one type of ionic liquid and a conductive polymer with high electric conductivity of polythiophene resulting from polymerization, whereby a solid electrolytic capacitor compatibly attaining both of an excellent withstand voltage characteristic and an excellent impedance characteristic can be implemented.

The chemical polymerization composition preferably contains a solvent, so that chemical polymerization can more homogeneously progress. While the solvent is not particularly restricted, water, butanol, ethanol, methanol or acetone can be employed, for example.

When the chemical polymerization composition contains two types of ionic liquids, preferable molar ratios ($N_A$/B) and ($N_B$/B) between the numbers ($N_A$) and ($N_B$) of moles of the ionic liquids and the number (B) of moles of the polymerizable substance are in the range of 0.01/1 to 10/1, and more preferable molar ratios are in the range of 0.01/1 to 0.6/1. The effect of improving the withstand voltage tends to be reduced if the aforementioned molar ratios ($N_A$/B) and ($N_B$/B) are smaller than 0.01/1. If the aforementioned molar ratios ($N_A$/B) and ($N_B$/B) are larger than 10/1, on the other hand, electric conductivity of the electrolytic layer in the electrolytic capacitor tends to be reduced due to the presence of excess ionic liquids, to not only reduce the impedance characteristic of the obtained electrolytic capacitor but also remarkably deteriorate the mechanical strength thereof. Also when the chemical polymerization composition contains at least three types of ionic liquids, the molar ratios between the ionic liquids and the polymerizable substance are preferably in the aforementioned range respectively.

The aforementioned preferable range refers to the molar ratios in the chemical polymerization composition, and is not directed to the molar ratios between the ionic liquids and the polymerizable substance contained in the electrolytic layer in practice. While the optimum range of the molar ratios between the ionic liquids and the polymerizable substance contained in the chemical polymerization composition is as stated above, it is predicted that the molar ratios between the ionic liquids and the polymerizable substance present in the electrolytic layer formed in practice are smaller than the ratios in the chemical polymerization composition. This is because the chemically polymerized conductive polymer is insoluble in the solvent employed in the chemical polymerization step while the ionic liquids are generally soluble in the solvent to come out from the electrolytic layer in the chemical polymerization step or a cleaning step.

While the range of the molar ratios between the ionic liquids and the polymerizable substance for carrying out the present invention is as stated above, optimum values vary with the types of the ionic liquids and the type of the polymerizable substance. Therefore, a general idea for obtaining the optimum proportion is now described. When a small quantity of ionic liquid is added to a chemical polymerization composition, the impedance can be generally reduced. In general, however, the impedance is increased to the contrary if the quantity of the ionic liquid is excessive. Noting only the impedance characteristic, therefore, a proper quantity of the ionic liquid varies with the type of the ionic liquid.

On the other hand, the withstand voltage of a solid electrolytic capacitor is also improved by addition of an ionic liquid. In general, the withstand voltage is increased as the quantity of the ionic liquid is increased. If the quantity of the ionic liquid is over-excessive, however, the shape of the electrolyte itself cannot be maintained due to the liquid state. The effect of improving the withstand voltage also varies with the type of the ionic liquid. It is to be noted that the effects of improving the impedance characteristic and the withstand voltage characteristic appear through different mechanisms respectively. Thus, an ionic liquid having a high effect of improving the impedance characteristic does not necessarily exhibit a high effect of improving the withstand voltage.

Therefore, the impedance characteristic and a high withstand voltage can be compatibly attained by adding both of an ionic liquid improving the impedance characteristic with a small quantity and another ionic liquid exhibiting a high effect of improving the withstand voltage with a small quantity thereby suppressing the total quantity. As to the distribution of the ionic liquids in the electrolyte, the following can be said in general: Since the impedance characteristic in a high-frequency range depends on the conductivity of the overall electrolyte, the ionic liquid having a high effect of reducing the impedance is preferably added to the overall electrolyte containing the conductive polymer. On the other hand, a portion of the electrolyte close to the dielectric film contributes to the effect of improving the withstand voltage. Therefore, the ionic liquid having the high effect of improving the withstand voltage is preferably provided in a large quantity around the dielectric film of the electrolyte. In an extreme case, it is also useful in the present invention, not to add the ionic liquid having the high effect of improving the withstand voltage to a portion of the electrolyte separated from the dielectric film.

As a specific method for executing this, a method of carrying out the chemical polymerization step not only once but a plurality of times with a plurality of chemical polymerization compositions having different ionic liquid concentrations can be listed.

The solvent contained in the chemical polymerization composition is successively evaporated in a heating process of the chemical polymerization step, whereby the composite containing the ionic liquids and the conductive polymer is formed at the end of the chemical polymerization step.

The chemical polymerization composition may contain a polymerization prompter or a surface active agent, in addition to the ionic liquids and the polymerizable substance. While the polymerization prompter is used as a polymerization catalyst, ferric paratoluenesulfonic acid, ferric naphthalenesulfonic acid, ferric n-butylnaphthalenesulfonic acid or ferric triisopropylnaphthalenesulfonic acid can be listed as an exemplary polymerization prompter. In particular, ferric paratoluenesulfonic acid serving as a dopant is preferably employed as the polymerization prompter.

While the mixing ratio between the polymerizable substance and the polymerization prompter in the chemical polymerization composition is not particularly restricted, the mixing ratio (polymerizable substance/polymerization prompter) between the polymerizable substance and the polymerization prompter is preferably in the range of 1/0.1 to 1/5 in molar ratio, and more preferably in the range of 1/0.3 to 1/3. An electrolytic layer having particularly high electronic conductivity can be obtained by preparing the chemical polymerization composition in this mixing ratio.

When the chemical polymerization composition containing the aforementioned ionic liquids, the polymerizable substance and the polymerization prompter is employed, heat treatment is preferably performed at a temperature of 20 to 140° C., particularly at a temperature of 20 to 120° C., for 0.5 to 10 hours, if the conductive polymer is PEDOT, for example. Polymerization excellently progresses if the temperature is at least 20° C., while reaction does not excessively quickly progress but a dense chemical polymerization layer can be formed if the temperature is not more than 140° C.

As hereinabove described, the chemical polymerization step may be carried out only once, or may be repeated a plurality of times while setting the molar ratios between the ionic liquids and the polymerizable substance to a constant level in the chemical polymerization composition or varying the molar ratios. In particular, a high ionic conductivity region provided with the ionic liquids in high concentrations can be reliably formed on the surface of the electrolytic layer closer to the anode while suppressing the contents of the ionic liquids in the overall electrolytic layer, by reducing the concentrations of the ionic liquids in the chemical polymerization compositions stepwise. Thus, a solid electrolytic capacitor excellent in impedance characteristic and withstand voltage characteristic can be obtained.

(Cathode Forming Step)

After the electrolytic layer is formed in the aforementioned manner, the cathode is formed by a well-known method of applying carbon paste and silver paste or the like. In order to increase the capacitance of the electrolytic capacitor, a capacitor element may be formed by stacking a plurality of elements consisting of anodes, electrolytic layers and cathodes before drying the carbon paste and the silver paste, if necessary.

The solid electrolytic capacitor according to the present invention can be obtained by connecting the terminals to the anode and the cathode respectively after the aforementioned cathode forming step.

When an electrolytic capacitor employing aluminum as the anode metal is subjected to 40 V chemical conversion, for example, the breakdown voltage of the capacitor is dispersed between 20 V to 35 V, for example, and the capacitor withstands a voltage of about 16 V, for example, in practical use in consideration of safety, if the electrolytic layer is formed by general chemical polymerization employing no ionic liquids. On the other hand, the solid electrolytic capacitor having the electrolytic layer formed by the method of this embodiment stably obtains a withstand voltage in a narrow range of 35 V to 45 V, for example, and can attain an actual withstand voltage of about twice that of the conventional solid electrolytic capacitor, i.e., 30 V, in consideration of safety. Further, this solid electrolytic capacitor can attain an impedance characteristic substantially equivalent to that of the solid electrolytic capacitor prepared with no ionic liquids. This tendency is similarly observed in a solid electrolytic capacitor employing tantalum as the anode metal.

While the present invention is now described in more detail with reference to Examples, the present invention is not restricted to these.

EXAMPLES

Comparative Example 1

An aluminum etched foil (size: 4 by 3.3 mm) employed as an anode metal was dipped in a 3 mass % aqueous solution of ammonium adipate and chemically converted by increasing a voltage applied thereto from 0 to 40 V at a speed of 10 mV/sec. and subsequently applying a constant voltage of 40 V for 40 minutes, thereby forming a dielectric film consisting of an oxide film on the surface of the aluminum etched foil. This aluminum etched foil was cleaned with flowing deionized water for 10 minutes and thereafter dried at 105° C. for 5 minutes, thereby preparing an anode consisting of the anode metal and the dielectric film. The in-liquid capacitance of the obtained anode was 4.2 μF.

A 3,4-ethylene dioxythiophene monomer, ferric paratoluenesulfonic acid and 1-butanol were employed as a raw monomer for a conductive polymer, i.e., a polymerizable substance, a polymerization prompter and a solvent respectively, and blended with each other in the following blending ratios, thereby preparing a chemical polymerization composition employed for forming an electrolytic layer:

Raw monomer for conductive polymer: 1 g
Polymerization prompter: 2 g
Solvent: 3 g This chemical polymerization composition was mixed in a sufficiently dried beaker of 30 cm$^3$, and the anode was thereafter dipped in the chemical polymerization composition, pulled up and thereafter heated at 100° C. for 1 hour and further at 140° C. for 1 hour. The anode was repeatedly dipped in the chemical polymerization composition and heated three times, so that the surface thereof was uniformly covered with an electrolytic layer (chemical polymerization step). Thus, the electrolytic layer was formed.

A cathode was formed by applying carbon paste ("Varniphite FU" by Nippon Graphite Industries, Ltd.) onto the electrolytic layer obtained in the above and drying the same, and thereafter applying silver paste ("Everyohm ME" by Nippon Graphite Industries, Ltd.) and drying the same. A lead wire was extracted from the silver paste and connected to a terminal. A solid electrolytic capacitor obtained in this manner was aged at 20 V for 1 hour, and impedances at 10 KHz and 100 KHz and a withstand voltage (V) thereof were measured respectively.

The voltage was increased at a speed of 200 mV/sec., and a level causing a flow of a current of 10 mA was defined as the withstand voltage. Table 1 shows the obtained characteristics. The impedances (at 10 KHz and 100 KHz) were 2.5Ω and 0.4Ω respectively, and the withstand voltage (V) was 39.2 V.

Comparative Example 2

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was butylmethyl imidazolium bistrifluorosulfoneimide (BMImTFSI):

Raw monomer for conductive polymer: 1 g
Polymerization prompter: 2 g
Solvent: 3 g
Ionic liquid A: 0.210 g (molar ratio with respect to monomer: 0.1)

Table 1 shows the obtained characteristics. The impedances (at 10 KHz and 100 KHz) were 1.4Ω and 0.2Ω respectively, and the withstand voltage (V) was 49.4 V. In other words, the impedances (at 10 KHz and 100 KHz) were reduced and the withstand voltage was improved as compared with comparative example 1.

Comparative Example 3

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was BMImTFSI, similarly to comparative example 2:

Raw monomer for conductive polymer: 1 g
Polymerization prompter: 2 g
Solvent: 3 g
Ionic liquid A: 1.052 g (molar ratio with respect to monomer: 0.5)

Table 1 shows the obtained characteristics. The impedances (at 10 KHz and 100 KHz) were 4.9Ω and 1.2Ω respectively, and the withstand voltage (V) was 54.8 V. In other words, the impedances (at 10 KHz and 100 KHz) were increased as compared with comparative example 2, although the withstand voltage was further improved.

Comparative Example 4

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was ethylmethyl imidazolium paratoluenesulfonic acid (ENImPTSO):

Raw monomer for conductive polymer: 1 g
Polymerization prompter: 2 g
Solvent: 3 g
Ionic liquid A: 0.141 g (molar ratio with respect to monomer: 0.1)

Table 1 shows the obtained characteristics. The impedances (at 10 KHz and 100 KHz) were 0.5Ω and 0.2Ω respectively, and the withstand voltage (V) was 43.8 V. In other words, the impedances (at 10 KHz and 100 KHz) were reduced and the withstand voltage was improved as compared with comparative example 1, similarly to comparative example 2. As compared with comparative example 2, however, the impedances were smaller, and the effect of improving the withstand voltage was also small. It has been clarified that this ionic liquid EMImPTSO exhibiting a high effect of reducing the impedance has a smaller effect of improving the withstand voltage as compared with the ionic liquid BMImTFSI employed in comparative example 2.

Example 1

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquids A and B were BMImTFSI employed in comparative examples 2 and 3 and EMImPTSO employed in comparative example 4 respectively:

Raw monomer for conductive polymer: 1 g
Polymerization prompter: 2 g
Solvent: 3 g
Ionic liquid A: 0.210 g (molar ratio with respect to monomer: 0.1)
Ionic liquid B: 0.141 g (molar ratio with respect to monomer: 0.1)

Table 1 shows the obtained characteristics. The impedances (at 10 KHz and 100 KHz) were 0.5Ω and 0.3Ω respectively, and the withstand voltage (V) was 56.5 V. It was possible to attain the withstand voltage higher than that of comparative example 4 while maintaining the impedances lower than those of comparative examples 2 and 3 due to the employment of the two types of ionic liquids, for compatibly attaining both of an excellent impedance characteristic and an excellent withstand voltage characteristic.

FIG. 1 is a sectional view schematically showing a capacitor element of the solid electrolytic capacitor according to Example 1. As shown in FIG. 1, the solid electrolytic capacitor according to Example 1 comprises an electrolytic layer 3 containing at least two types of ionic liquids and a conductive polymer on an anode consisting of an anode metal 1 and a dielectric film 2 formed on the surface thereof, and a cathode 4 is formed on electrolytic layer 3.

Comparative Example 5

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was butylmethyl imidazolium $PF_6$ ($BMImPF_6$):

Raw monomer for conductive polymer: 1 g
Polymerization prompter: 2 g
Solvent: 3 g
Ionic liquid A: 0.724 g (molar ratio with respect to monomer: 0.5)

Table 1 shows the obtained characteristics. The impedances (at 10 KHz and 100 KHz) were 28.0Ω and 9.4Ω respectively, and the withstand voltage (V) was 51.7 V. In other words, the impedances were remarkably increased as compared with comparative example 1, although the withstand voltage was remarkably improved. Butylmethyl imidazolium $PF_6$ was an ionic liquid exhibiting no effect of reducing the impedance in this concentration region, although the same has the effect of improving the withstand voltage.

Example 2

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquids A and B were EMImPTSO employed in comparative example 4 and BMImPF$_6$ employed in comparative example 5 respectively:

Raw monomer for conductive polymer: 1 g
Polymerization prompter: 2 g
Solvent: 3 g
Ionic liquid A: 0.141 g (molar ratio with respect to monomer: 0.1)
Ionic liquid B: 0.145 g (molar ratio with respect to monomer: 0.1)

Table 1 shows the obtained characteristics. The impedances (at 10 KHz and 100 KHz) were 2.0Ω and 0.6Ω respectively, and the withstand voltage (V) was 50.2 V. It was possible to obtain the withstand voltage substantially identical to that of comparative example 5 while maintaining the low impedances due to the employment of EMImPTSO along with BMImPF$_6$, for compatibly attaining both of an excellent impedance characteristic and an excellent withstand voltage characteristic.

Example 3

An anode and an electrolytic layer were formed similarly to comparative example 1 except that a chemical polymerization composition was prepared in the following blending ratios. While the anode was repeatedly dipped and heated three times in comparative example 1, however, the anode according to Example 3 was dipped and heated only once. The chemical polymerization composition employed at this time was prepared in the following blending ratios. The following ionic liquids A and B were BMImTFSI employed in comparative examples 2 and 3 and butylmethyl imidazolium trifluoromethanesulfonic acid (BMImCF$_3$SO$_3$) respectively:

Raw monomer for conductive polymer: 1 g
Polymerization prompter: 2 g
Solvent: 3 g
Ionic liquid A: 0.210 g (molar ratio with respect to monomer: 0.1)
Ionic liquid B: 0.203 g (molar ratio with respect to monomer: 0.1)

Table 1 shows the obtained characteristics. The impedances (at 10 KHz and 100 KHz) were 0.4Ω and 0.2Ω respectively, and the withstand voltage (V) was 49.1 V. It was possible to obtain the high withstand voltage substantially identical to that of comparative example 2 while maintaining the impedances lower than those of comparative examples 2 and 3 employing BMImTFSI due to the employment of BMImCF$_3$SO$_3$, for compatibly attaining both of an excellent impedance characteristic and an excellent withstand voltage characteristic.

Comparative Example 6

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was BMImCHF$_2$(CF$_2$)$_3$CH$_2$SO$_3$:

Raw monomer for conductive polymer: 1 g
Polymerization prompter: 2 g
Solvent: 3 g
Ionic liquid A: 0.225 g (molar ratio with respect to monomer: 0.1)

Table 1 shows the obtained characteristics. The impedances (at 10 KHz and 100 KHz) were 0.4Ω and 0.2Ω respectively, and the withstand voltage (V) was 43.7 V. It is understood that the withstand voltage substantially identical to that of comparative example 4 can be obtained while maintaining the impedances substantially identical to those of comparative example 4 employing EMImPTSO at the same molar ratio, due to the employment of BMImCHF$_2$(CF$_2$)$_3$CH$_2$SO$_3$.

Comparative Example 7

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquid A was BMImCF$_3$SO$_3$ employed in Example 3:

Raw monomer for conductive polymer: 1 g
Polymerization prompter: 2 g
Solvent: 3 g
Ionic liquid A: 0.203 g (molar ratio with respect to monomer: 0.1)

Table 1 shows the obtained characteristics. The impedances (at 10 KHz and 100 KHz) were 0.4Ω and 0.3Ω respectively, and the withstand voltage (V) was 43.9 V. It is understood that the withstand voltage substantially identical to that of comparative example 4 can be obtained while maintaining the impedances substantially identical to those of comparative example 4 employing EMImPTSO at the same molar ratio, due to the employment of BMImCF$_3$SO$_3$.

Example 4

An anode and an electrolytic layer were formed similarly to comparative example 1 except that a chemical polymerization composition was prepared in the following blending ratios, and a solid electrolytic capacitor was prepared similarly to comparative example 1 and subjected to similar measurements. The following ionic liquids A and B were EMImPTSO employed in comparative example 4 and BMImPF$_6$ employed in comparative example 5 respectively:

Raw monomer for conductive polymer: 1 g
Polymerization prompter: 2 g
Solvent: 3 g
Ionic liquid A: 0.141 g (molar ratio with respect to monomer: 0.1)
Ionic liquid B: 0.450-g (molar ratio with respect to monomer: 0.2)

Table 1 shows the obtained characteristics. The impedances (at 10 KHz and 100 KHz) were 0.6Ω and 0.3Ω respectively, and the withstand voltage (V) was 64.5 V. It was possible to obtain the high withstand voltage while maintaining the impedances substantially identical to those in the case of employing only EMImPTSO due to the employment of EMImPTSO and BMImPF$_6$, for compatibly attaining both of an excellent impedance characteristic and an excellent withstand voltage characteristic.

Example 5

An anode and a first electrolytic layer were formed similarly to comparative example 1 except that a chemical polymerization composition was prepared in the following blending ratios. While the anode was repeatedly dipped and heated three times in comparative example 1, however, the anode was dipped and heated only once at this time. The chemical polymerization composition employed at this time was prepared in the following blending ratios. The following ionic liquids A and B were BMImTFSI employed in comparative examples 2 and 3 and EMImPTSO employed in comparative example 4 respectively:

Raw monomer for conductive polymer: 1 g
Polymerization prompter: 2 g
Solvent: 3 g
Ionic liquid A: 0.421 g (molar ratio with respect to monomer: 0.2)
Ionic liquid B: 0.141 g (molar ratio with respect to monomer: 0.1)

Then, a second electrolytic layer was formed on the first electrolytic layer similarly to comparative example 1. At this time, the anode was repeatedly dipped and heated twice. A chemical polymerization composition was prepared in the following blending ratios. The following ionic liquid B was EMImPTSO employed in comparative example 4:

Raw monomer for conductive polymer: 1 g
Polymerization prompter: 2 g
Solvent: 3 g
Ionic liquid B: 0.141 g (molar ratio with respect to monomer: 0.1)

In other words, the second electrolytic layer was formed without employing the ionic liquid A (BMImTFSI) added to the first electrolytic layer. Thereafter a solid electrolytic capacitor was prepared similarly to comparative example 1, and subjected to similar measurements. Table 1 shows the obtained characteristics. The impedances (at 10 KHz and 100 KHz) were 0.5Ω and 0.3Ω respectively, and the withstand voltage (V) was 61.2 V. It was recognized that an excellent impedance characteristic was attained although the two electrolytic layers were formed dissimilarly to the remaining Examples and comparative examples, and an excellent withstand voltage characteristic was also compatibly attained.

Table 1 shows the results of measurements of the impedances (at 10 KHz and 100 KHz) and the withstand voltages (V) in the solid electrolytic capacitors obtained according to Examples 1 to 5 and comparative examples 1 to 7.

TABLE 1

| | Impedance (Ω) | | | |
| --- | --- | --- | --- | --- |
| | 10 KHZ | 100 KHZ | Withstand Voltage(V) | Ionic Liquid (Molar Ratio to Monomer) |
| Comparative Example 1 | 2.5 | 0.4 | 39.2 | — |
| Comparative Example 2 | 1.4 | 0.2 | 49.4 | BMImTFSI (0.1) |
| Comparative Example 3 | 4.9 | 1.2 | 54.8 | BMImTFSI (0.5) |
| Comparative Example 4 | 0.5 | 0.2 | 43.8 | EMImPTSO (0.1) |
| Example 1 | 0.5 | 0.3 | 56.5 | BMImTFSI (0.1)/EMImPTSO (0.1) |
| Comperative Example 5 | 28.0 | 9.4 | 51.7 | BMImPF$_6$ (0.5) |
| Example 2 | 2.0 | 0.6 | 50.2 | EMImPTSO (0.1)/BMImPF$_6$ (0.1) |
| Example 3 | 0.4 | 0.2 | 49.1 | BMImTFSI (0.1)/BMImCF$_3$SO$_3$ (0.1) |
| Comparative Example 6 | 0.4 | 0.2 | 43.7 | BMImCHF$_2$(CF$_2$)$_3$CH$_2$SO$_3$ (0.1) |
| Comparative Example 7 | 0.4 | 0.3 | 43.9 | BMImCF$_3$SO$_3$ (0.1) |
| Example 4 | 0.6 | 0.3 | 64.5 | EMImPTSO (0.1)/BMImPF$_6$ (0.2) |
| Example 5 | 0.5 | 0.3 | 61.2 | First Layer: BMImTFSI (0.2)/EMImPTSO (0.1) Second layer: EMImPTSO (0.1) |

Thus, the solid electrolytic capacitor according to the present invention highly compatibly attains both of an excellent withstand voltage characteristic and an excellent impedance characteristic, and is preferably applicable to a power rectifying circuit, a high-frequency circuit, a coupled circuit or a communication apparatus, for example.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor having an electrolytic layer containing at least two types of ionic liquids and a conductive polymer;
   wherein the conductive polymer consists of at least one material selected from the group consisting of polythiophene or a derivative thereof, polypyrrole or a derivative thereof, polyaniline or a derivative thereof, and polyquinone or a derivative thereof.

2. The solid electrolytic capacitor according to claim 1, wherein
   said at least two types of ionic liquids contain at least two types of cationic components and/or at least two types of anionic components.

3. The solid electrolytic capacitor according to claim 1, wherein
   at least one of said at least two types of ionic liquids contains an anionic component expressed in the following general formula (1) or the following general formula (2):

$$R_4OSO_3^- \quad (1)$$

$$R_4SO_3^- \quad (2)$$

(in the above general formulas (1) and (2), $R_A$ represents an aliphatic hydrocarbon radical or an aromatic hydrocarbon radical allowed to have one or more substituents).

4. The solid electrolytic capacitor according to claim 3, wherein
   $R_A$ in the above general formulas (1) and (2) represents an aliphatic hydrocarbon radical or an aromatic hydrocarbon radical containing one or more fluorine atoms.

5. The solid electrolytic capacitor according to claim 3, wherein
   at least one of said at least two types of ionic liquids contains any anionic component selected from a group consisting of carboxy anion expressed in the following general formula (3), $BF_4^-$, $PF_6^-$ and $N(SO_2CF_3)_2^-$:

$$R_4COO^- \quad (3).$$

6. The solid electrolytic capacitor according to claim 5, wherein
   $R_A$ in the above general formula (3) represents an aliphatic hydrocarbon radical or an aromatic hydrocarbon radical containing one or more fluorine atoms.

7. The solid electrolytic capacitor according to claim 1, wherein
   at least one of said at least two types of ionic liquids contains any anionic component selected from a group consisting of carboxy anion expressed in the following general formula (3), $BF_4^-$, $PF_6^-$ and $N(SO_2CF_3)_2^-$:

$$R_4COO^- \quad (3)$$

(in the above general formula (3), $R_A$ represents an aliphatic hydrocarbon radical or an aromatic hydrocarbon radical allowed to have one or more substituents).

8. The solid electrolytic capacitor according to claim 7, wherein
$R_4$ in the above general formula (3) represents an aliphatic hydrocarbon radical or an aromatic hydrocarbon radical containing one or more fluorine atoms.

9. The solid electrolytic capacitor according to claim 1, wherein
at least one of said at least two types of ionic liquids is present in the thickness direction of said electrolytic layer in a different concentration distribution.

10. The solid electrolytic capacitor according to claim 1, at least comprising said electrolytic layer as well as an anode and a cathode opposed to each other through said electrolytic layer, wherein
said anode is formed by an anode metal and a dielectric film, and
said electrolytic layer is formed in contact with said dielectric film, and contains at least two types of ionic liquids and a conductive polymer.

11. The solid electrolytic capacitor according to claim 1, wherein
at least one of the ionic liquids contained in the electrolytic layer reduces an impedance of the electrolytic capacitor, and
at least one of the remaining ionic liquid(s) increases a withstand voltage of the electrolytic capacitor.

12. The solid electrolytic capacitor according to claim 1, wherein the electrolytic layer includes a composite containing the ionic liquids and the conductive polymer.

13. The solid electrolytic capacitor according to claim 1, wherein the electrolytic layer includes
a composite containing the ionic liquids and a part of the conductive polymer, and
the remaining conductive polymer present as a single conductive polymer.

14. The solid electrolytic capacitor according to claim 1, wherein the solid electrolytic capacitor is a chip-type capacitor.

15. The solid electrolytic capacitor according to claim 1, wherein the solid electrolytic capacitor is a wound-type capacitor comprising a capacitor element prepared by successively stacking and winding said electrolytic layer, a first separator, a cathode and a second separator in this order, on a dielectric film of an anode.

16. The solid electrolytic capacitor according to claim 1, further comprising a dielectric film, wherein
said electrolytic layer is formed in contact with said dielectric film, and
a portion of the electrolyte layer close to the dielectric film contributes to an effect of increasing a withstand voltage of the capacitor.

17. The solid electrolytic capacitor according to claim 1, wherein the solid electrolytic capacitor having the electrolytic layer has a withstand voltage in a range of 35V to 45V.

18. The solid electrolytic capacitor according to claim 1, wherein the solid electrolytic capacitor having the electrolytic layer has a withstand voltage of 49V or more.

* * * * *